United States Patent
Reed et al.

(10) Patent No.: US 8,548,923 B2
(45) Date of Patent: Oct. 1, 2013

(54) METHOD AND SYSTEM FOR FACILITATING DATA ACCESS AND MANAGEMENT ON A SECURE TOKEN

(76) Inventors: Sonia Reed, Danville, CA (US); Christian Aabye, Foster City, CA (US)

(*) Notice: Subject to any disclaimer, the term of this patent is extended or adjusted under 35 U.S.C. 154(b) by 395 days.

(21) Appl. No.: 12/727,741

(22) Filed: Mar. 19, 2010

(65) Prior Publication Data
US 2010/0250956 A1 Sep. 30, 2010

Related U.S. Application Data

(63) Continuation of application No. 10/656,858, filed on Sep. 5, 2003, now abandoned.

(60) Provisional application No. 60/416,937, filed on Oct. 7, 2002.

(51) Int. Cl.
*G06Q 40/00* (2012.01)

(52) U.S. Cl.
USPC .................. 705/65; 705/64; 705/66; 705/67

(58) Field of Classification Search
USPC .............................................. 705/65, 66, 67
See application file for complete search history.

(56) References Cited

U.S. PATENT DOCUMENTS

| | | |
|---|---|---|
| 3,798,605 A | 3/1974 | Feistel |
| 4,405,829 A | 9/1983 | Rivest et al. |
| 4,924,378 A | 5/1990 | Hershey et al. |
| 4,985,615 A | 1/1991 | Iijima |
| 5,048,085 A | 9/1991 | Abraham et al. |
| 5,049,728 A | 9/1991 | Rovin |
| 5,065,429 A | 11/1991 | Lang |
| 5,148,481 A | 9/1992 | Abraham et al. |
| 5,161,256 A | 11/1992 | Iijima |
| 5,191,611 A | 3/1993 | Lang |
| 5,204,961 A | 4/1993 | Barlow |
| 5,235,642 A | 8/1993 | Wobber et al. |
| 5,239,648 A | 8/1993 | Nukui |
| 5,241,599 A | 8/1993 | Bellovin et al. |
| 5,272,754 A | 12/1993 | Boerbert |
| 5,274,824 A | 12/1993 | Howarth |
| 5,371,692 A | 12/1994 | Draeger et al. |
| 5,416,842 A | 5/1995 | Aziz |

(Continued)

FOREIGN PATENT DOCUMENTS

| | | |
|---|---|---|
| AU | 739906 B2 | 6/1999 |
| AU | 744984 B2 | 8/1999 |

(Continued)

OTHER PUBLICATIONS

Rankl et al; "Handbuch der Chipkarten"; Mar. 1, 1999; Hanser Fachbuch; Germany; XP-002533774, ISBN: 9783446211155.

(Continued)

*Primary Examiner* — Mahesh Dwivedi
(74) *Attorney, Agent, or Firm* — Kilpatrick Townsend Stockton LLP

(57) ABSTRACT

A system for facilitating data access and management on a smart card is provided. According to one exemplary aspect of the system, a storage architecture is provided in the smart card which allows data stored thereon to be shared by multiple parties. Access to data stored on the smart card is controlled by various access methods depending on the actions to be taken with respect to the data to be accessed.

17 Claims, 4 Drawing Sheets

(56) References Cited

U.S. PATENT DOCUMENTS

| | | | |
|---|---|---|---|
| 5,418,854 A | 5/1995 | Kaufman et al. | |
| 5,440,635 A | 8/1995 | Bellovin et al. | |
| 5,448,045 A | 9/1995 | Clark | |
| 5,455,953 A | 10/1995 | Russell | |
| 5,491,752 A | 2/1996 | Kaufman et al. | |
| 5,495,533 A | 2/1996 | Linehan et al. | |
| 5,502,766 A | 3/1996 | Boebert et al. | |
| 5,504,701 A | 4/1996 | Takahashi et al. | |
| 5,526,233 A | 6/1996 | Hayakawa | |
| 5,544,246 A | 8/1996 | Mandelbaum et al. | |
| 5,563,395 A | 10/1996 | Hoshino | |
| 5,563,400 A | 10/1996 | Le Roux | |
| 5,578,808 A | 11/1996 | Taylor | |
| 5,590,199 A | 12/1996 | Krajewski, Jr. et al. | |
| 5,602,918 A | 2/1997 | Chen et al. | |
| 5,606,615 A | 2/1997 | Lapointe et al. | |
| 5,613,012 A | 3/1997 | Hoffman et al. | |
| 5,649,118 A * | 7/1997 | Carlisle et al. | 705/41 |
| 5,657,388 A | 8/1997 | Weiss | |
| 5,682,027 A * | 10/1997 | Bertina et al. | 235/380 |
| 5,684,742 A | 11/1997 | Bublitz et al. | |
| 5,742,845 A | 4/1998 | Wagner | |
| 5,757,920 A | 5/1998 | Misra et al. | |
| 5,802,519 A | 9/1998 | De Jong | |
| 5,805,719 A | 9/1998 | Pare, Jr. et al. | |
| 5,815,657 A | 9/1998 | Williams et al. | |
| 5,838,812 A | 11/1998 | Pare, Jr. et al. | |
| 5,841,866 A | 11/1998 | Bruwer et al. | |
| 5,887,063 A | 3/1999 | Varadharajan et al. | |
| 5,892,902 A | 4/1999 | Clark | |
| 5,897,616 A | 4/1999 | Kanevsky et al. | |
| 5,898,838 A | 4/1999 | Wagner | |
| 5,901,284 A | 5/1999 | Hamdy-Swink | |
| 5,905,908 A | 5/1999 | Wagner | |
| 5,917,168 A | 6/1999 | Nakamura et al. | |
| 5,931,917 A | 8/1999 | Nguyen et al. | |
| 5,944,794 A | 8/1999 | Okamoto | |
| 5,974,504 A | 10/1999 | Lee et al. | |
| 5,987,132 A | 11/1999 | Rowney | |
| 5,991,411 A | 11/1999 | Kaufman et al. | |
| 5,991,519 A | 11/1999 | Benhammou et al. | |
| 5,996,076 A | 11/1999 | Rowney et al. | |
| 6,011,976 A | 1/2000 | Michaels et al. | |
| 6,016,476 A | 1/2000 | Maes et al. | |
| 6,023,762 A | 2/2000 | Dean et al. | |
| 6,055,314 A | 4/2000 | Spies et al. | |
| 6,061,796 A | 5/2000 | Chen et al. | |
| 6,073,238 A | 6/2000 | Drupsteen | |
| 6,073,242 A | 6/2000 | Hardy et al. | |
| 6,075,860 A | 6/2000 | Ketcham | |
| 6,101,477 A | 8/2000 | Hohle et al. | |
| 6,119,228 A | 9/2000 | Angelo et al. | |
| 6,128,602 A | 10/2000 | Northington et al. | |
| 6,147,744 A | 11/2000 | Smart et al. | |
| 6,158,011 A | 12/2000 | Chen et al. | |
| 6,173,400 B1 | 1/2001 | Perlman et al. | |
| 6,185,681 B1 | 2/2001 | Zizzi | |
| 6,189,096 B1 | 2/2001 | Haverty | |
| 6,193,163 B1 | 2/2001 | Fehrman et al. | |
| 6,199,762 B1 * | 3/2001 | Hohle | 235/492 |
| 6,208,264 B1 | 3/2001 | Bradney et al. | |
| 6,216,014 B1 | 4/2001 | Proust et al. | |
| 6,219,439 B1 | 4/2001 | Burger | |
| 6,219,669 B1 | 4/2001 | Haff et al. | |
| 6,220,510 B1 | 4/2001 | Everett et al. | |
| 6,222,933 B1 | 4/2001 | Mittermayer et al. | |
| 6,226,752 B1 | 5/2001 | Gupta et al. | |
| 6,253,027 B1 | 6/2001 | Weber et al. | |
| 6,279,112 B1 | 8/2001 | O'Toole, Jr. et al. | |
| 6,282,656 B1 | 8/2001 | Wang | |
| 6,296,191 B1 | 10/2001 | Hamann et al. | |
| 6,304,658 B1 | 10/2001 | Kocher et al. | |
| 6,308,317 B1 | 10/2001 | Wilkinson et al. | |
| 6,367,011 B1 * | 4/2002 | Lee et al. | 713/172 |
| 6,385,729 B1 | 5/2002 | DiGiorgio et al. | |
| 6,481,632 B2 * | 11/2002 | Wentker et al. | 235/492 |
| 6,557,032 B1 | 4/2003 | Jones et al. | |
| 6,629,591 B1 | 10/2003 | Griswold et al. | |
| 6,671,818 B1 | 12/2003 | Mikurak | |
| 6,754,181 B1 | 6/2004 | Elliott et al. | |
| 6,779,718 B1 | 8/2004 | Wlodarczyk | |
| 6,880,084 B1 | 4/2005 | Brittenham et al. | |
| 6,970,891 B1 * | 11/2005 | Deo et al. | 707/824 |
| 2002/0040936 A1 | 4/2002 | Wentker et al. | |
| 2002/0050528 A1 | 5/2002 | Everett et al. | |

FOREIGN PATENT DOCUMENTS

| | | |
|---|---|---|
| CA | 2317138 A1 | 1/2002 |
| DE | 19536548 A1 | 4/1997 |
| EP | 0447339 A2 | 1/1991 |
| EP | 0442839 A2 | 8/1991 |
| EP | 0566811 A1 | 4/1992 |
| EP | 0666550 A1 | 2/1994 |
| EP | 0644513 A2 | 9/1994 |
| EP | 0798673 A1 | 10/1997 |
| EP | 0831434 A1 | 3/1998 |
| EP | 0949593 A2 | 10/1999 |
| EP | 0949595 A2 | 10/1999 |
| EP | 0984404 A2 | 3/2000 |
| EP | 0984404 A3 | 3/2000 |
| EP | 1039403 A2 | 9/2000 |
| EP | 1072024 A1 | 1/2001 |
| EP | 0949595 A3 | 9/2001 |
| EP | 0932865 B1 | 8/2002 |
| FR | 2748834 A1 | 11/1997 |
| FR | 2 820 847 | 8/2002 |
| FR | 2 822 256 | 9/2002 |
| GB | 2238636 A | 6/1991 |
| GB | 2281645 A | 3/1995 |
| GB | 2298505 A | 9/1996 |
| GB | 2333630 A | 7/1999 |
| WO | WO 94/30023 A1 | 12/1994 |
| WO | WO 96/05549 A1 | 2/1996 |
| WO | WO 97/37331 A1 | 10/1997 |
| WO | WO 98/19237 A1 | 5/1998 |
| WO | WO 98/37526 A1 | 8/1998 |
| WO | WO 98/52159 A2 | 11/1998 |
| WO | WO 98/52159 A3 | 11/1998 |
| WO | WO 99/18504 A1 | 4/1999 |
| WO | WO 99/38129 A1 | 7/1999 |
| WO | WO 99/39257 A1 | 8/1999 |
| WO | WO 99/49426 A1 | 9/1999 |
| WO | WO 99/52065 A1 | 10/1999 |
| WO | WO 99/57675 A1 | 11/1999 |
| WO | WO 00/34927 A1 | 6/2000 |
| WO | WO 00/51070 A1 | 8/2000 |
| WO | WO 00/67212 A1 | 11/2000 |
| WO | WO 00/68902 A1 | 11/2000 |
| WO | WO 00/69183 A2 | 11/2000 |
| WO | WO 01/08087 A1 | 2/2001 |
| WO | WO 01/18746 A1 | 3/2001 |
| WO | WO 01/42887 A2 | 6/2001 |
| WO | WO 01/42887 A3 | 6/2001 |
| WO | WO 02/10918 A1 | 2/2002 |
| WO | WO 02/15037 A1 | 2/2002 |
| WO | WO 02/21466 A2 | 3/2002 |

OTHER PUBLICATIONS

Rankl et al; "Open Platform Handbuch der Chipkarten"; Jan. 1, 2002; XP-002461435.

Supplemental European Search Report for EP Patent Application No. 03774633.6, Jan. 28, 2010; 4 pages.

* cited by examiner

| XCID<br>EXTENDED CELL ID ||||
|---|---|---|---|
| VALUE ADD SERVICE PROVIDER ID || CID ||
| RID | EXT | CID ||
| Registered Value Add Service Provider Identifier | Value Add Service Provider Extension | Cell ID |
| 5 bytes | 3 bytes | 2 bytes |

*FIG. 3*

| AID (RID \|\| PIX) |||
|---|---|---|
| EXTENDED CELL ID || CELL LOCATOR |
| RID \|\| EXT | CID | Cell File ID |
| A000000999 \|\| 000001 | 1234 | 9876 |
| A000000999 \|\| 000001 | 2345 | 8765 |
| A000000999 \|\| 000012 | 2345 | 9876 |
| A000000888 \|\| 000000 | 1234 | 9876 |

*FIG. 4*

METHOD AND SYSTEM FOR FACILITATING DATA ACCESS AND MANAGEMENT ON A SECURE TOKEN

CROSS-REFERENCES TO RELATED APPLICATION(S)

The present application is a continuation of U.S. patent application Ser. No. 10/656,858, filed Sep. 5, 2003, entitled, "METHOD AND SYSTEM FOR FACILITATING DATA ACCESS AND MANAGEMENT ON A SECURE TOKEN", now abandoned which in turn claims the benefit of priority under 35 U.S.C. § 119 from U.S. Provisional Patent Application Ser. No. 60/416,937, entitled "METHOD AND SYSTEM FOR FACILITATING DATA ACCESS AND MANAGEMENT ON A SMARTCARD", filed on Oct. 7, 2002, both of which are hereby incorporated by reference herein in their entirety for all purposes.

BACKGROUND OF THE INVENTION

The present invention generally relates to data access and management and, more specifically, to a method and system for facilitating data access and management on a secure token, such as, a chip card or smart card.

Current technologies now allow multiple applications to be implemented on a single chip card. This ability to have multiple applications on a chip card has been identified as one of the key components for enhancing the business case of a chip card program. These multiple applications include, for example, value-add programs and the associated data required to operate them successfully. From a business perspective, it is preferable that value be obtained for all parties involved in the chip card program, including the issuer, acquirer, application owner, value add service provider and the cardholder.

Critical to the success of value-add applications on the chip card is the ability to maximize and efficiently use available space on the chip card to allow multiple applications or programs to operate, and to deploy an acceptance infrastructure that allows consumers to take full advantage of the functionality provided by the chip card.

While it is now possible to implement multiple applications on a chip card, these multiple applications (and their associated data) are often kept independent of one another within the chip card. For example, data belonging to one application is not shared by another application within the chip card, which in some cases result in redundancy. Due to the limited size of the chip card, such redundancy adversely affects the optimal use of resources on the chip card.

Hence, it would be desirable to provide a method and system that is capable of facilitating data access and management on a chip card in a more efficient manner.

BRIEF SUMMARY OF THE INVENTION

A method and system for facilitating data access and management on a smart card is provided. According to one exemplary embodiment, the smart card includes a storage architecture that allows data stored thereon to be shared by multiple parties. Access to data stored on the smart card is controlled by various access methods depending on the actions to be taken with respect to the data to be accessed.

According to one exemplary embodiment, the storage architecture provides a file structure that can have separate instances of the file structure. A separate instance is referred to as an environment. In one instance, an environment includes the common commands applet providing access to a directory, one or more cell groups under the directory (with each cell group being a sub-directory), and one or more cells under each cell group. Attributes and access conditions can be set at different levels including, for example, at the directory level, the cell group (or sub-directory) level and the cell level. This allows varying access levels for different parties thereby permitting data to be shared in various manners.

According to one exemplary embodiment, the storage architecture is implemented on a GlobalPlatform smart card. GlobalPlatform is an international smart card consortium of companies in the smart card industry which creates and advances standards and/or specification for smart card infrastructure. Alternatively, the storage architecture can also be implemented on a static or native smart card, i.e., a smart card having its own proprietary operating system.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 3 is a table illustrating an exemplary embodiment of the XCID according to one exemplary embodiment of the present invention; and FIG. 4 is an exemplary embodiment of a table of contents according to the present invention.

DETAILED DESCRIPTION OF THE INVENTION

The present invention in the form of one or more exemplary embodiments will now be described. Generally, the present invention is used to access and update data on a secure token, such as, a chip card or smart card. According to an exemplary embodiment, an open storage architecture is provided for applications on a secure token, such as, a chip card or smart card. This architecture can be used to access and store both static and dynamic data elements on smart cards for use by value-added applications.

Architecture Overview

Figure 1:
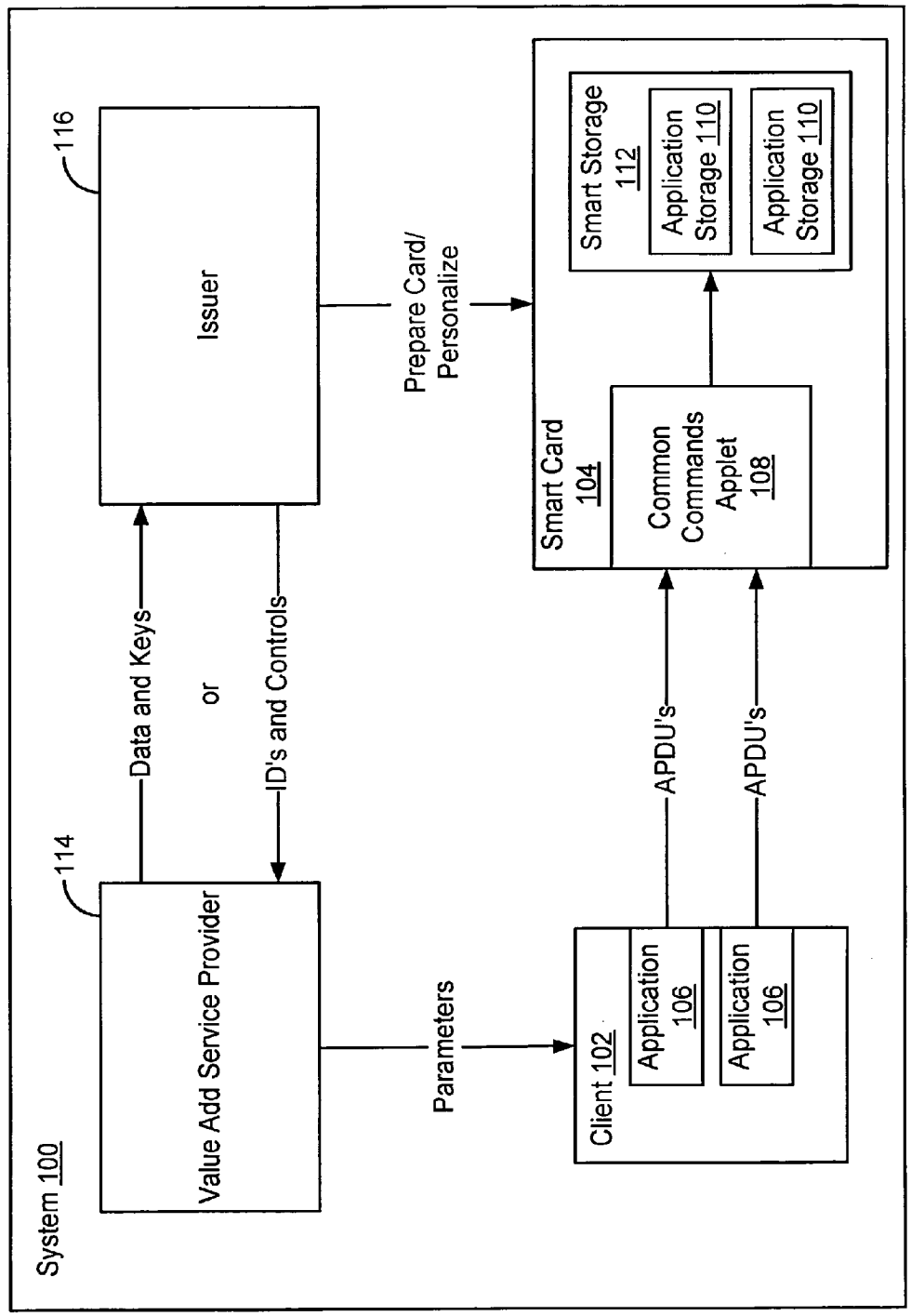
FIG. 1 is a simplified schematic diagram illustrating one exemplary embodiment of the present invention.

FIG. 1 is a simplified schematic diagram illustrating an exemplary embodiment of the present invention. In one exemplary embodiment, a system 100 includes a client 102 and a smart card 104. The client 102 includes one or more applications 106. The client 102 communicates with the smart card 104 using application protocol data units (APDUs). The smart card 104 is prepared by an issuer 116 in a personalization process. The client 102 also communicates with one or more backend systems operated by a value add service provider 114 in cooperation with the corresponding applications 106.

The smart card 104 includes a set of environments—a set of common commands applet 108, and a storage architecture named "Smart Storage" 112. The set of common commands 108 is used to facilitate interactions between the applications 106 and their corresponding application storage 110 within Smart Storage 112 on the smart card 104. A person of ordinary skill in the art should appreciate how to implement the set of common commands 108. In an exemplary embodiment, the set of common commands is installed onto the smart card 104 having a specific application storage 110 linked to a corresponding client application 106. As will be further described below, the Smart Storage 112 allows a file structure to be created once thereby providing specific files for each corresponding client application 106. Depending on how the file structure is created, the file structure may allow data to be shared by other client applications 106.

As will be further described below, the present invention allows an issuer of the smart card 104 to prepare space on the smart card 104 for a future implementation of applications or services. This space can be pre-allocated at personalization time (i.e., when the smart card 104 and environment is personalized); alternatively, the issuer can designate use of the space and to whom the space will be allocated after the smart card 104 has been personalized and issued. At the time of personalization of the smart card 104, the issuer does not need to have actual knowledge of the size or content of the data that will be stored in individual files on the smart card 104.

Once the smart card 104 is personalized, the issuer can decide later how to allocate and authorize use of the space on the smart card 104. In addition to defining the size of storage space, the issuer also defines the access and authorization methods necessary to enable access to the storage space. The storage architecture 112 allows an organization of the storage space into groups—application storage 110, which can then be allocated to various business partners, e.g., program operators. Access to specific portions of these groups can then be defined by the program operators in more detail.

Figure 2:
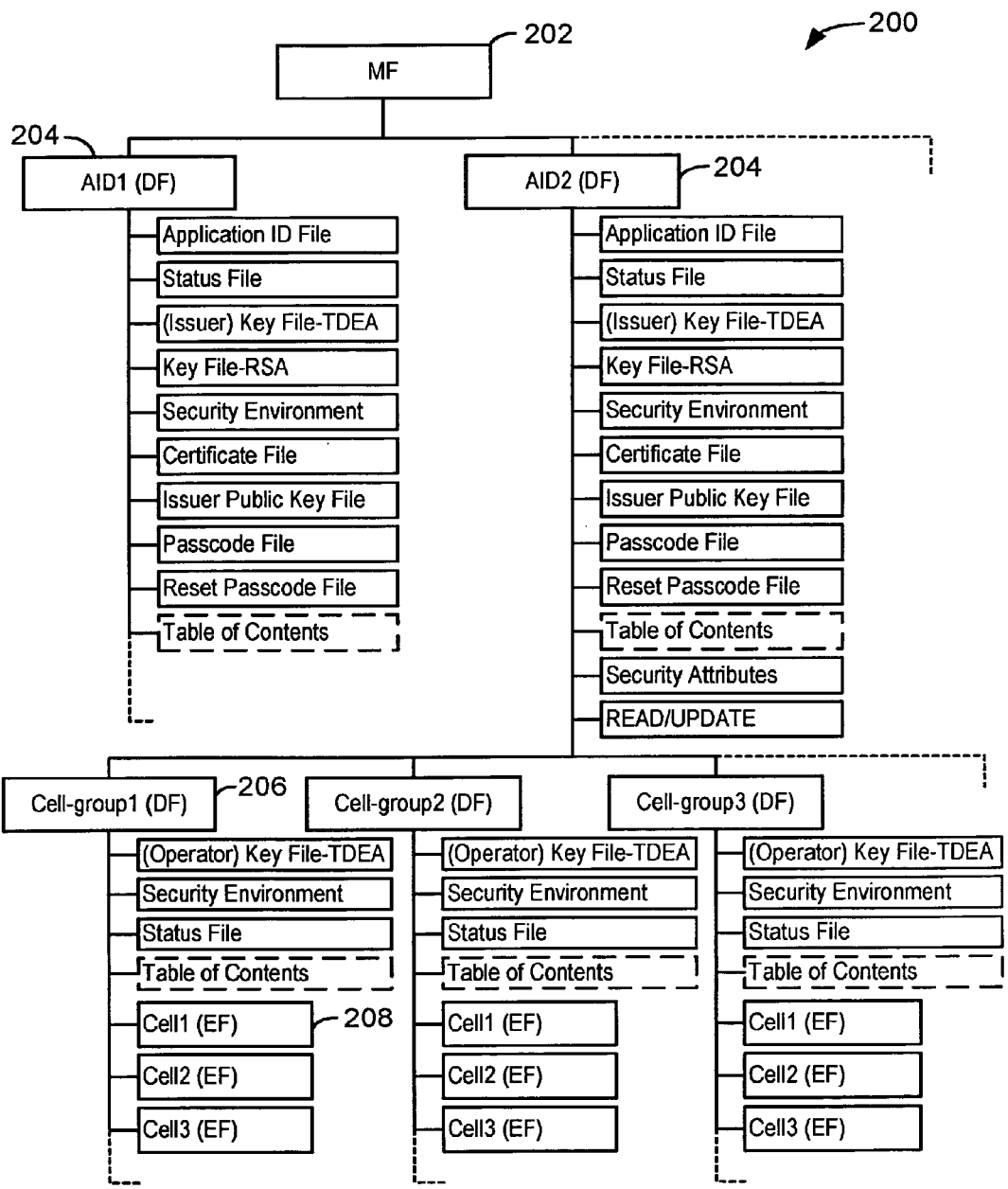
FIG. 2 is a simplified schematic diagram illustrating an exemplary file structure according to one exemplary embodiment of the present invention.

In an exemplary embodiment, the storage architecture 112 is an organization of data that can be retrieved and updated using a common commands applet. FIG. 2 illustrates an exemplary file structure of the storage architecture 112. The file structure 200 includes a master file 202 and one or more directories 204 identified by corresponding application identifiers (AIDs). Each directory 204 can be viewed as a storage instance of the storage architecture 112. For each directory 204, there is a number of associated files containing information that is used to facilitate communications between the common command applet and corresponding application. For example, such associated files include an application identification file, a status file, a key file, a security environment file, a certificate file, a passcode file and a reset passcode file, etc. One or more of these files are used to ensure that the common command applet is able to communicate with the corresponding directory 204 and files thereunder.

The application identification file contains a unique number to identify each storage instance contained on the smart card 104, plus related application information on that specific smart card, including, for example, a version number. Preferably, the issuer is responsible for creating both this unique number and additional data during personalization.

The status file contains specific status information (e.g., status of the smart card, customer segment or expiration date, etc.).

The key files contain cryptographic keys that are used for signatures and key/passcode encryption purposes.

The security environment file contains the access conditions for a specific cell group.

The certificate file contains RSA certificates.

The passcode file is used to store a cardholder passcode.

The reset passcode file is used to store special reset-codes, which is used in an off-line environment to reset the cardholder's passcode.

In one exemplary embodiment, each directory 204 further includes one or more cell groups 206. Each cell group 206 can be viewed as a sub-directory. Each sub-directory 206 can represent storage space for a corresponding application. These cell groups 206 are created at the time the smart card 104 is personalized or issued. The number of cell groups 206 that can be created depends on, amongst other things, the issuer of the smart card 104. For example, an issuer may want to reserve a specific amount of space for future utilization for a certain application. In some situations, the owner of specific cell groups is not known at the time of the smart card personalization. In such cases, ownership of cell groups can be transferred after the smart card 14 has been issued. Optionally, subject to space availability on the smart card 104, additional cell groups 206 can be created after the smart card 104 has been issued, for example, to a cardholder. Typically, creation of additional cell groups 206 is controlled by the issuer of the smart card 104. For each cell group, a maximum number of bytes and a maximum number of cells beneath that cell group are defined—thus giving the issuer the ability to control how much space is allocated for each application storage 110. In the context of the ISO 7816-4 standard, a cell group is contained in a dedicated file (DF). In an alternative exemplary embodiment, a directory 204 may not include any cell groups 206. Instead, cells can be created directly under an AID that has no cell groups. Description relating to cells will be further provided below.

For each cell group 206, there may be associated security attributes, such as keys, that are used to access that cell group 206. These security attributes are initially set by the issuer of the smart card 104 and then subsequently provided to the program operator. The value add service provider can then use these security attributes to access the cell group 206. Optionally, the security environment associated with a cell group 206 can be modified, thereby preventing a previously approved value add service provider from accessing that cell group 206 and/or allowing a new value add service provider to access the same.

Each cell group 206 is made up of one or more cells 208. Cells 208 are the actual storage entities within the storage architecture 112. In an exemplary embodiment, each cell 208 includes cell attributes, access conditions and data. Alternatively, within the storage architecture 112 or application storage 110, each part of the space that is separated from the other parts by a specific defined access-method, by a specific access-condition or simply by a logical separation, is called a cell 208. The management of each cell 208 is dependent on the corresponding access conditions for that cell in a specific implementation. In an exemplary embodiment of a file system using the ISO 7816-4 standard, a cell is contained in an elementary file (EF). Typically, data contained in a cell is program-specific data. Cell data can be managed by a back-end host system such as a loyalty host system, customer relationship management (CRM), customer database or a consumer-driven client application.

A number of cells are maintained within the storage architecture 112 or application storage 110. If neither the owner nor the content of specific cells is known at the time of the smart card personalization, the personalization process only defines the common commands applet and, if the issuer chooses, a number of pre-defined cell groups with default access conditions. Cells within a pre-defined cell group can then be created after the smart card 104 has been issued. In other words, the number of cells and the size of each cell do not have to be specified before personalization of the smart card 104. Preferably, however, a preliminary sizing assessment should be made to ensure maximum utilization of the available card storage capacity.

Furthermore, it should be noted that a cell is what makes a corresponding file identifiable to the external world, such as, the client 102. Via the use of a cell, data from a corresponding file on the smart card 104 can be accessed and manipulated by a client 102 without requiring the client 102 to know the underlying details and logistics concerning the actual address of the data on the smart card 104.

As mentioned above, cells can be organized within a sub-directory called a cell group. The keys used for controlling access to cells under a cell group are defined at the cell group level.

Within the Smart Storage 112, security attributes are assigned to files on two levels, namely, a cell group file and a cell file. The security attributes for cell group files and cell files can be assigned during smart card personalization.

The cell group file contains security attributes which define the conditions for creating and deleting a file within that cell group. Authority to create files can be limited to the value add service provider having access to the keys for a specific cell group. Likewise, the conditions for creating and deleting the files directly under a directory 204 AID can be limited to a single entity, for example, the issuer.

The cell file is assigned security attributes which define when a client 102 can create, read, update or delete data from the cell or whether data is to be encrypted during transport to or from the cell.

In order to be able to recognize each cell, the common commands applet maintains a table of contents of all cells within the corresponding storage instance. This table of contents is linked to the specific AID associated with the corresponding storage instance implemented logically on a cell group level. Hence, for a specific AID or storage instance, a table of contents is maintained for all active cells (i.e., cells containing data) grouped into specific cell groups. The table of contents is used by the client 102 to address a specific cell in the corresponding storage instance or application storage 110. There can be multiple storage instances on the smart card 104, but each storage instance has its separate table of contents administered by the corresponding common commands applet.

The common commands applet has no knowledge of the actual contents of a cell. The common commands applet only administers access to a cell. It is up to the client application 106 to interpret the contents of a cell. Furthermore, the client application 106 is equipped with information on the requisite keys and software that apply to a specific cell and the respective access conditions for specific cells. In some situation, clients 102 may be able to get on-line access to an issuer or value add service provider back-end system in order to retrieve the information necessary to access specific cells.

As mentioned above, each cell may be associated with an access method or access conditions. Optionally, no access method may be defined for a specific cell, meaning that the cell can be freely accessed. In one exemplary embodiment, one of a number of access methods can be associated with a cell. Such access methods can be categorized based on different domains including, for example, cardholder domain, card issuer domain and value add service provider domain. In the cardholder domain, a cardholder wishing to access a cell is prompted to provide a passcode in either clear or encrypted text. In the card issuer domain and the value add service provider domain, a digital signature is provided in order to gain access to the cell.

Also, as mentioned above, each cell includes attributes that are unique to that cell and its contents. These attributes are applied by the owner of the contents contained in the cell and may vary during the different stages of smart card life cycle and usage. These stages include, for example, initialization where the issuer is responsible for protecting the cells from unauthorized access prior to card personalization; personalization where the issuer may transfer responsibility and authority for the cell and its contents based upon a pre-established agreement with the entity performing personalization; activation where unique attributes may be added to the cell by the value add service provider or the cardholder; usage where data may be modified during cardholder usage to reflect specific program data usage; and deactivation where data may be deactivated or deleted to reflect that the content has been used or expired or that the data is no longer of interest to the cardholder.

Cell Management

AIDs on the smart card 104 are assigned by an issuer of that smart card 104. In one implementation, a credit card service association, such as Visa, provides unique AIDs to issuers for interoperability reasons. Furthermore, under each AID, the issuer determines which value add service provider(s) are eligible to access and manage data under that specific AID. Each value add service provider is identified by an unique identifier or value add service provider ID. The cell ID (CID) is an identifier assigned by the value add service provider. The CID is unique within a given value add service provider ID. If multiple value add service providers are using the same storage architecture 112, each such value add service provider is identified by its own corresponding value add service provider ID. The unique CID can therefore be a combined element, as further described below. This unique CID for multiple program operators is referred to as eXtended CID or XCID. FIG. 3 is a table illustrating an exemplary embodiment of the XCID.

Each cell contains data related to a specific program, scheme, implementation or application and is uniquely identified within the storage architecture 112. In order to uniquely identify a cell, a unique global identifier is defined. In one exemplary implementation, in order to create unique CIDs, each value add service provider applies to ISO (International Standards Organization) for a unique registered application provider identifier (RID) before they are able to implement the present invention. Each value add service provider can then use its unique RID to create its own CIDs. Typically, value add service providers are responsible for ensuring the uniqueness of all CIDs assigned under their AIDs.

It should be understood that within a specific CID, a further detailed breakdown of the cell content into specific programs is possible. In an exemplary implementation, it is up to the value add service provider to implement a detailed layout of programs including, for example, a further detailed "table of contents" of the cell.

A cell locator is used to locate a cell. The cell locator is the logical address of the specific file containing the cell within the smart card 104. It is stored in the table of contents maintained by the common commands applet and is used to locate a specific cell based upon a request from the client application. In one exemplary implementation, the cell locator is the cell file ID under the cell group in which the cell resides.

As mentioned above, the common commands applet contains a corresponding table of contents with information on the location of specific cells. The table of contents translates the external ID for a specific cell (i.e., the XCID) to the internal actual physical file on the smart card 104 that contains the data for that cell. Hence, the table of contents is a composite element combining the XCIDs and the cell file IDs for a specific cell group. A unique table of contents is created for each application storage 110 created under the storage architecture 112. FIG. 4 illustrates an exemplary table of contents.

Security Attributes

As mentioned above, security attributes can be assigned to a directory 204, a cell group 206 and a cell 208. In one exemplary implementation, the security attributes provided under the storage architecture 112 are based on the security attributes as defined in ISO 7816-9 and the security environment as defined in ISO 7816-8. A person of ordinary skill in the art will appreciate how to use the ISO standards to provide the security attributes according to the present invention. For purposes of definition, some of the names in parentheses below are taken from the ISO standards.

Permissions (Access Modes)

In an exemplary implementation, permissions (Access Modes) are defined for cells and cell groups or AIDs. With respect to permissions for cells, such permissions are defined on a cell level as Access Mode bytes for EF's. The permissions allow or restrict the following functions or operations to take place: (1) create cell (creates a cell within the storage architecture 112, inserts the CID into the table of content and creates the Cell-attributes); (2) read cell data (returns data in a cell to the client application); (3) update cell data (updates the data in a cell); and (4) delete cell (blanks out the data in a cell, blanks the cell attributes and deletes the CID in the table of contents).

With respect to permissions for cell groups or AIDs, such permissions are defined on a cell group level or AID level as Access Mode bytes for DF's. The permissions allow or restrict the following functions or operations to take place: (1) create file (creates the DF file containing the cell group or the EF file containing the cell and the security attributes of the cell group or cell); and (2) delete file (deletes the DF file containing the cell group or the EF file containing the cell). These permissions allow creation or deletion of a file under a specific cell group or AID. This means that the permission to create and delete a DF file is made on the AID level, while the permission to create and delete an EF file is made for a specific cell group.

Access Methods

Access to data contained in a cell is based on a matrix including possible methods and supported functions. In an exemplary implementation, there are six permission or access methods including, for example, (1) signature inbound (SM command)—either a message authentication code (MAC) created using a triple DES symmetric cryptographic algorithm (TDEA) session-key, or an RSA-based digital signature; (2) signature outbound (SM response)—either a MAC created using a TDEA session-key, or an RSA-based digital signature; (3) encrypted passcode (user authentication, knowledge-based)—either an ISO 9796-1 format 1 encrypted Passcode using a TDEA session key, or a PKCS #1 RSA-OAEP formatted passcode wrapped in a RSA public key; (4) clear passcode (user authentication, knowledge-based)—a passcode presented in clear text; (5) key exchange-encrypted (encipherment/decipherment)—key is encrypted before being returned or decrypted before being received; and biometrics (user authentication, biometric-based).

Interactions Between Permissions and Methods

For each of the six functions mentioned above in connection with permissions for cells and cell groups or AIDs, one or more of the six access methods can be set. The access method(s) for one function can be set independently from another function.

The three methods, signature inbound (SM Command (CCT, DST)), encrypted passcode (user authentication, knowledge-based (AT)), and clear passcode (user authentication, knowledge-based (AT)), are access conditions to be met before the common commands applet will perform the specific function. The access conditions can be met as part of the transaction (signature inbound) or can be satisfied in a previous command to the common commands applet. (encrypted passcode or clear passcode).

The method, signature outbound (SM Response (CCT, DST), causes the common commands applet to perform a signature generation on both the data in the command to which it responds and on the data in the cell.

The method, cell-data exchange encrypted (Encipherment (CT) for read and Decipherment (CT) for update), causes a key to be decrypted before the data is updated (for the update functions) or encrypted before the key is returned via the read function.

The two methods, encrypted passcode and clear passcode, are mutually exclusive.

Rules for Security Environment

In on exemplary embodiment, the implementation of the permissions and their associated access methods is based on the security environment (SE) as defined in the ISO 7816-8 standard. Since the storage architecture 112 allows creation of files containing SE's and files containing keys under a cell group after personalization, there are some additional implementation-specific rules for these files. For example, if a SE file for a specific cell group is not present, the SE file for the AID is used instead; if a specific SE number is not present in a SE file for a specific cell group, the same SE number in the SE file for the AID is used, if available; if a key file for a specific cell group is not present, the key file for the AID is used instead, even if the key is referenced via a SE file for the cell group; if a specific key index is not present in a key file for a specific cell group, the same key index in the key file for the AID is used, if available; and the SE file for the AID is not updated.

Authentication Methods

For the purpose of authentication after personalization, the storage architecture 112 supports a number of authentication methods including, for example, TDEA-signatures or MAC, RSA-signatures or digital signatures, encrypted passcode and clear passcode. A person of ordinary skill in the art will appreciate how to incorporate various authentication methods for use in connection with the present invention.

Permissions for Creating Cells

In one exemplary implementation, creation of cells is controlled by the issuer of the smart card 104. The issuer can delegate authorization for creating cells under a specific cell group to a value add service provider after the a smart card has been personalized, thus transferring ownership of such cell group to the value add service provider.

Ownership

The owner of the cells is the entity holding the key allowing creation and deletion of cells in a specific cell group or AID. Initially, the owner is the issuer of the smart card who personalizes the initial keys into the key files, but the issuer can delegate ownership to a specific value add service provider in a number of ways. For example, in an on-line environment, ownership can be transferred by establishing a secure messaging transaction between the issuer and the smart card by using an on-line connection between the value add service provider and the issuer; alternatively, in an off-line environment, by distributing the keys for a specific cell group to the value add service provider before the smart card is introduced into the value add service provider's system.

Methods for Creating Cells

It is possible to define an open access control for creating cells, i.e., any entity can create cells on the smart card 104. In an exemplary embodiment, one entity, such as an issuer, controls the use of space on the smart card 104. In that situation, a number of different methods can be used to obtain permission to create cells including, for example, use of a RSA-signature (which requires an issuer public key on the smart card) or a TDEA-signature (which requires a derived secret key on the smart card).

Update of Key File

An update of the key file can reflect that a specific value add service provider or merchant now has ownership of a cell. This can occur as a normal update record command with a special set of security attributes allowing encryption of the key during transport. A number of encryption methods including, for example, RSA-encryption and TDEA encryption, can be used to encrypt the keys to be updated in the key files.

Keys

The storage architecture or Smart Storage 112 is very flexible as to which keys are used to access files and how they are used. Keys are stored in key files with an attached key index referenced internally from the various files to be protected. This means for instance that the same file can be protected by different keys that relate to different commands (e.g. one key for read, another key for update) or that multiple files can be protected by the same key for all commands.

In an exemplary embodiment, two sets of keys are used. One set is used for transferring ownership of card-space from the issuer or its delegate to the value add service provider or its delegate. In an exemplary implementation, the set of keys used in the transfer of ownership is installed when the smart card is personalized.

Another set is used by the value add service provider to access specific cells. Generally, this set of keys can be installed after a smart card is issued. These keys control access to cells and authentication of specific cell data. They are typically installed at the time of transferring ownership for a given cell from the issuer to the value add service provider. Once transferred, these keys are the responsibility of the value add service provider.

Storage Architecture Attributes

For each of the storage architecture or Smart Storage elements: cell, cell group and AID, a number of attributes are attached. Based on the disclosure and teachings provided herein, a person of ordinary skill in the art will appreciate other attributes that can be used in connection with the present invention.

Cell Attributes

Cell attributes are set during creation of a cell, either during card personalization or via a Create Cell command. The cell attributes can also be changed using an Update Cell-status command. In one exemplary embodiment, the Create Cell and Update Cell-status commands are part of the set of common commands described above. These attributes include, for example, cell status, cell activation date, cell expiry date and cell log file ID, as will be further described.

Cell status is a status-byte for the cell providing information on whether the content of the cell is available or not. In one exemplary embodiment, the possible status-codes are: (1) Active (cell content is available with no restriction); (2) Opt-out (even though the cell exists, the cardholder has chosen not to make use of the content); and (3) Used (even though the cell exists, the cardholder has already made use of the content of the cell or, even if the cell expiry date has not been reached, the content of the cell is consider expired).

The cell activation date is used to identify the date from which the content of the cell can be read or updated. A cell is not considered available unless the Cell activation date has been reached and should not be read or updated before that date. If the cell activation date for a specific cell is not present, the cell is considered available by default.

The cell expiry date is used to specify when the content of the cell can no longer be used. A cell is not considered available if the cell expiry date has been reached and should not be read or updated after that date. If cell expiry date for a specific cell is not present, the cell is considered available by default.

The cell log file ID is used to identity the file in which logging of update, create and delete commands of a cell is stored.

Cell Group Attributes

In one exemplary embodiment, there is a number of cell group attributes including, for example, cell group status. Cell group status can be set during creation of a status file for a cell group either during personalization or by updating the status file for the cell group. The cell group status can assume one of a number of status codes including, for example, (1) Active (cell content is available with no restriction); (2) Opt-out (cardholder has chosen not to make use of the cells under the specific cell-group); (3) Inactive (cell group is present but not yet active); and (4) Blocked (cell group is not to be used). Typically, it is up to the client to define what action will be taken on receipt of the status codes.

AID Attributes

In one exemplary embodiment, there is a number of AID attributes including, for example, AID status and AID expiry date. The AID status is set during the creation of a status file for an AID either during personalization or by updating the status file for the AID. The AID expiry date is used to identify when a specific instance of the applet or the application is considered expired and can no longer be used.

As described above, the present invention provides a set of functions and a repository for data that allow multiple parties with existing business relationships to access and share chip card data according to agreed security controls.

In an illustrative application, the sharing of information may be between an airline and a grocery store. The chip card incorporating the present invention can contain the consumer grocery store program number and the airline frequent flier number used by existing back end host systems. In order to facilitate the identification of the consumer and validate participation in a joint promotional program, the grocery store is given access to both the airline frequent flier number and the grocery store program number stored in the chip card. However, if the consumer is not participating in the joint promotional program, then the airline program is denied access to the grocery store program number on the chip card.

In another illustrative application, the present invention allows sharing of information between multiple parties including, for example, an issuer, a merchant and a third-party sponsor such as a credit card service association. The issuer, the merchant and the third-party sponsor may be involved in a joint loyalty program. Each of these parties may store its information on a smart card issued to a cardholder. The information stored by these parties on the smart card can be shared in a number of ways. In one instance, the issuer may allow both the merchant and the third party sponsor to access one portion of its information stored on the smart card; in another instance, the issuer may allow only the third party sponsor to access another portion of its information while denying access to the merchant. Furthermore, access to the information can be controlled based on different access methods depending on actions to be taken with respect to the information to be accessed. Based on the disclosure and teachings provided herein, a person of ordinary skill in the art will know of other ways and/or methods to deploy the present invention in various applications.

According to one exemplary embodiment, the storage architecture or Smart Storage is implemented on a Global-Platform smart card. Alternatively, the storage architecture can also be implemented on a static or native smart card, i.e., a smart card having its own proprietary operating system.

It should be understood that the present invention can be implemented using control logic, in the form of software or hardware or a combination of both. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for facilitating data management on a secure token, comprising:
    a client having a plurality of applications residing thereon;
    a secure token having a storage architecture, wherein the storage architecture includes:
        a directory and one or more attributes associated with the directory, wherein each attribute of the one or more attributes associated with the directory determines a level of access to the directory for one application of the plurality of applications,
        an application identifier associating the directory with a second application selected from the plurality of applications;
        one or more cell groups under the directory, each cell group having one or more associated attributes, wherein each attribute of the one or more attributes associated with the cell group determines a level of access to that cell group for one application of the plurality of applications, and
        one or more cells under each cell group, each cell having one or more associated attributes, wherein each attribute of the one or more attributes associated with the cell determines a level of access to that cell for one application of the plurality of applications,
    wherein the one or more associated attributes for a first cell group of the one or more cell groups permits access to the first cell group and the one or more associated attributes for the first cell group by the first application and a second application of the plurality of applications, and the one or more attributes associated with the directory deny access to the first cell group to a third application of the plurality of applications; and
    wherein the one or more attributes associated with a first cell of the first cell group further control operations on contents of the cell by the plurality of applications such that the one or more attributes associated with the first cell permit a first set of operations on the contents of that cell and the one or more attributes associated with the first cell by the first application and permit a second set of operations on the contents of that cell and the one or more attributes associated with the first cell by the second application, wherein the first set of operations is different from the second set of operations;
    an issuer computer, wherein the issuer computer comprises a set of environments, a set of initial states for the one or more associated attributes for the cell group and the one or more attributes associated with the cell that set a status of the storage architecture on the secure token; and
    a Value Added Serve Provider computer, wherein the value add service provider comprises control data parameters that are provided to both the issuer and the client to set the one or more associated attributes for the cell group and the one or more attributes associated with the cell.

2. The system of claim 1 wherein the first set of operations includes read only access and the second set of operations includes read access and write access for the directory.

3. The system of claim 1 wherein the first set of operations is a subset of the second set of operations.

4. The system of claim 3 wherein the first set of operations includes read only access and the second set of operations includes read access and write access for the cell group.

5. The system of claim 1 wherein the first set of operations includes read only access and the second set of operations includes read access and write access for the cell.

6. The system of claim 1 wherein ownership of one of the one or more cell groups is modified subsequent to issuance of the secure token to a token holder.

7. The system of claim 1 wherein the access level for the directory, the one or more cell groups, and the one or more cells is determined per individual application.

8. The system of claim 1 wherein each cell of the one or more cells comprise an activation date, wherein each cell cannot be used prior to the activation date.

9. The system of claim 1 wherein each cell of the one or more cells comprise an expiry date, wherein each cell cannot be used after the expiry date.

10. The system of claim 1 wherein each cell of the one or more cells comprise a status byte, the status byte indicating if content of the cell is available.

11. The system of claim 1 further comprising a second client, wherein the second client comprises a set of updated states for the one or more associated attributes for the cell group and the one or more attributes associated with the cell that that update the status of the storage architecture on the secure token.

12. A secure token comprising:
    a directory and one or more attributes associated with the directory, wherein each attribute of the one or more attributes associated with the directory determines a level of access to the directory for one application of the plurality of applications,
    an application identifier associating the directory with a corresponding application selected from the plurality of applications;
    one or more cell groups under the directory, each cell group having one or more associated attributes, wherein each attribute of the one or more attributes associated with the cell group determines a level of access to that cell group for one application of the plurality of applications, and
    one or more cells under each cell group, each cell having one or more associated attributes, wherein each attribute of the one or more attributes associated with the cell determines a level of access to that cell for one application of the plurality of applications;
    wherein the one or more associated attributes for a first cell group of the one or more cell groups permits access to the first cell group and the one or more associated attributes for the first cell group by the first application and a second application of the plurality of applications, and the one or more attributes associated with the directory deny access to the first cell group to a third application of the plurality of applications;

wherein the one or more attributes associated with a first cell of the first cell group further control operations on contents of the cell and the one or more attributes associated with the first cell by the plurality of applications such that the one or more attributes associated with the first cell permit a first set of operations on the contents of that cell and the one or more attributes associated with the first cell by the first application and permit a second set of operations on the contents of that cell and the one or more attributes associated with the first cell by the second application, wherein the first set of operations is different from the second set of operations;

an issuer computer, wherein the issuer computer comprises a set of environments, a set of initial states for the one or more associated attributes for the cell group and the one or more attributes associated with the cell that set a status of the storage architecture on the secure token; and a Value Added Serve Provider computer, wherein the value add service provider comprises control data parameters that are provided to both the issuer and the client to set the one or more associated attributes for the cell group and the one or more attributes associated with the cell.

13. The secure token of claim 12 wherein the first set of operations is a subset of the second set of operations.

14. The system of claim 12 wherein the first set of operations includes read only access and the second set of operations includes read access and write access for the cell.

15. A method for facilitating data management on a secure token, comprising:

providing a directory and one or more attributes associated with the directory, wherein each attribute of the one or more attributes associated with the directory determines a level of access to the directory for one application of the plurality of applications, providing one or more cell groups under the directory, each cell group having one or more associated attributes, wherein each attribute of the one or more attributes associated with the cell group determines a level of access to that cell group for one application of the plurality of applications, and one or more cells under each cell group, each cell having one or more associated attributes, wherein each attribute of the one or more attributes associated with the cell determines a level of access to that cell for one application of the plurality of applications;

wherein an application identifier associates the directory with a corresponding application selected from the plurality of applications;

wherein the one or more associated attributes for a first cell group of the one or more cell groups permits access to the first cell group and the one or more associated attributes for the first cell group by the first application and a second application of the plurality of applications, and the one or more attributes associated with the directory deny access to the first cell group to a third application of the plurality of applications;

wherein the one or more attributes associated with a first cell of the first cell group further control operations on contents of the cell and the one or more attributes associated with the first cell by the plurality of applications such that the one or more attributes associated with the first cell permit a first set of operations on the contents of that cell and the one or more attributes associated with the first cell by the first application and permit a second set of operations on the contents of that cell and the one or more attributes associated with the first cell by the second application, wherein the first set of operations is different from the second set of operations;

providing an issuer computer, wherein the issuer computer comprises a set of environments, a set of initial states for the one or more associated attributes for the cell group and the one or more attributes associated with the cell that set a status of the storage architecture on the secure token; and providing a Value Added Serve Provider computer, wherein the value add service provider comprises control data parameters that are provided to both the issuer and the client to set the one or more associated attributes for the cell group and the one or more attributes associated with the cell.

16. The method of claim 15 wherein the first set of operations is a subset of the second set of operations.

17. The method of claim 15 wherein the first set of operations includes read only access and the second set of operations includes read access and write access for the cell.

* * * * *